United States Patent
Kanaya et al.

(10) Patent No.: US 11,119,456 B2
(45) Date of Patent: Sep. 14, 2021

(54) PRODUCTION SYSTEM, INFORMATION PROCESSING METHOD, AND PRODUCTION METHOD

(71) Applicants: KANEKA CORPORATION, Osaka (JP); Kaneka Americas Holding, Inc., Pasadena, TX (US)

(72) Inventors: Kento Kanaya, Pasadena, TX (US); Takafumi Yamaguchi, Hyogo (JP); Yosuke Aoki, Hyogo (JP)

(73) Assignees: KANEKA CORPORATION, Osaka (JP); Kaneka Americas Holding, Inc., Pasadena, TX (US)

( * ) Notice: Subject to any disclaimer, the term of this patent is extended or adjusted under 35 U.S.C. 154(b) by 393 days.

(21) Appl. No.: 16/353,881

(22) Filed: Mar. 14, 2019

(65) Prior Publication Data

US 2020/0293011 A1 Sep. 17, 2020

(51) Int. Cl.
*G05B 13/04* (2006.01)
*G05B 19/418* (2006.01)
(Continued)

(52) U.S. Cl.
CPC ....... *G05B 13/048* (2013.01); *G05B 19/4188* (2013.01); *G05B 19/41865* (2013.01);
(Continued)

(58) Field of Classification Search
CPC ............ G05B 13/048; G05B 19/41875; G05B 2219/32194; G05B 19/41865; G05B 19/4188; C08J 9/16; C08J 3/12; B29C 2948/9298; B29C 48/92; B29C 48/10; B29C 49/78

See application file for complete search history.

(56) References Cited

U.S. PATENT DOCUMENTS 5,414,619 A * 5/1995 Katayama ............... B21B 37/16
700/150
5,493,631 A * 2/1996 Huang ................. G05B 13/027
706/23

(Continued)

FOREIGN PATENT DOCUMENTS

JP 2011008562 A 1/2011

*Primary Examiner* — Shogo Sasaki
(74) *Attorney, Agent, or Firm* — Osha Bergman Watanabe & Burton LLP

(57) ABSTRACT

A production system includes an information processing device that carries out the processes of: (i) generating one or more production condition candidates each of which is a candidate for a production condition under which the product is produced; (ii) determining, using a prediction model, a prediction of a production result of a case in which the product is produced under each of the one or more production condition candidates; and (iii) generates, by evaluating a result of the prediction based on a predetermined evaluation standard, an evaluation of each of the one or more production condition candidates. The information processing device repeats the process (ii) while changing between the one or more production condition candidates, and determines a production condition candidate, the evaluation of which in the process (iii) satisfies a predetermined standard, to be the production condition under which the product is produced.

13 Claims, 10 Drawing Sheets

(51) Int. Cl.
  *B29C 49/78* (2006.01)
  *C08J 3/12* (2006.01)
  *C08J 9/16* (2006.01)

(52) U.S. Cl.
  CPC ................ *B29C 49/78* (2013.01); *C08J 3/12* (2013.01); *C08J 9/16* (2013.01)

(56) References Cited

U.S. PATENT DOCUMENTS

| | | | |
|---|---|---|---|
| 5,822,740 A * | 10/1998 | Haissig | F24D 19/1084 |
| | | | 706/3 |
| 9,046,882 B2 * | 6/2015 | Bartee | C12M 43/02 |
| 9,110,462 B2 * | 8/2015 | Bourg, Jr. | G05B 19/41865 |
| 9,122,260 B2 * | 9/2015 | Lou | G05B 13/04 |
| 9,134,711 B2 * | 9/2015 | Bourg, Jr. | G05B 13/042 |
| 10,545,482 B2 * | 1/2020 | Dash | G05B 13/04 |
| 10,739,758 B2 * | 8/2020 | Luan | G05B 13/022 |
| 2006/0100721 A1 * | 5/2006 | Piche | G05B 13/027 |
| | | | 700/47 |
| 2008/0183311 A1 * | 7/2008 | MacArthur | G05B 17/02 |
| | | | 700/29 |
| 2009/0018671 A1 * | 1/2009 | Srinivasan | G05B 17/02 |
| | | | 700/1 |
| 2009/0265021 A1 * | 10/2009 | Dubay | G05B 13/04 |
| | | | 700/33 |
| 2012/0003623 A1 * | 1/2012 | Bartee | C12M 43/02 |
| | | | 435/3 |

* cited by examiner

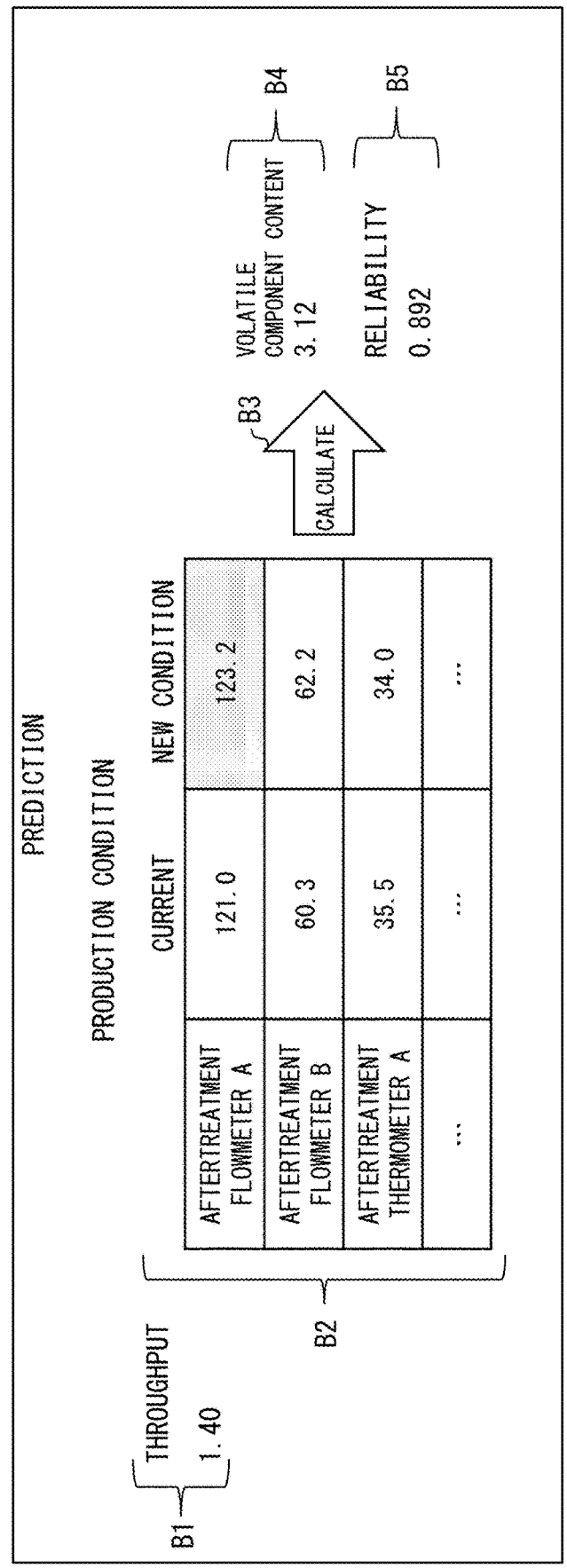

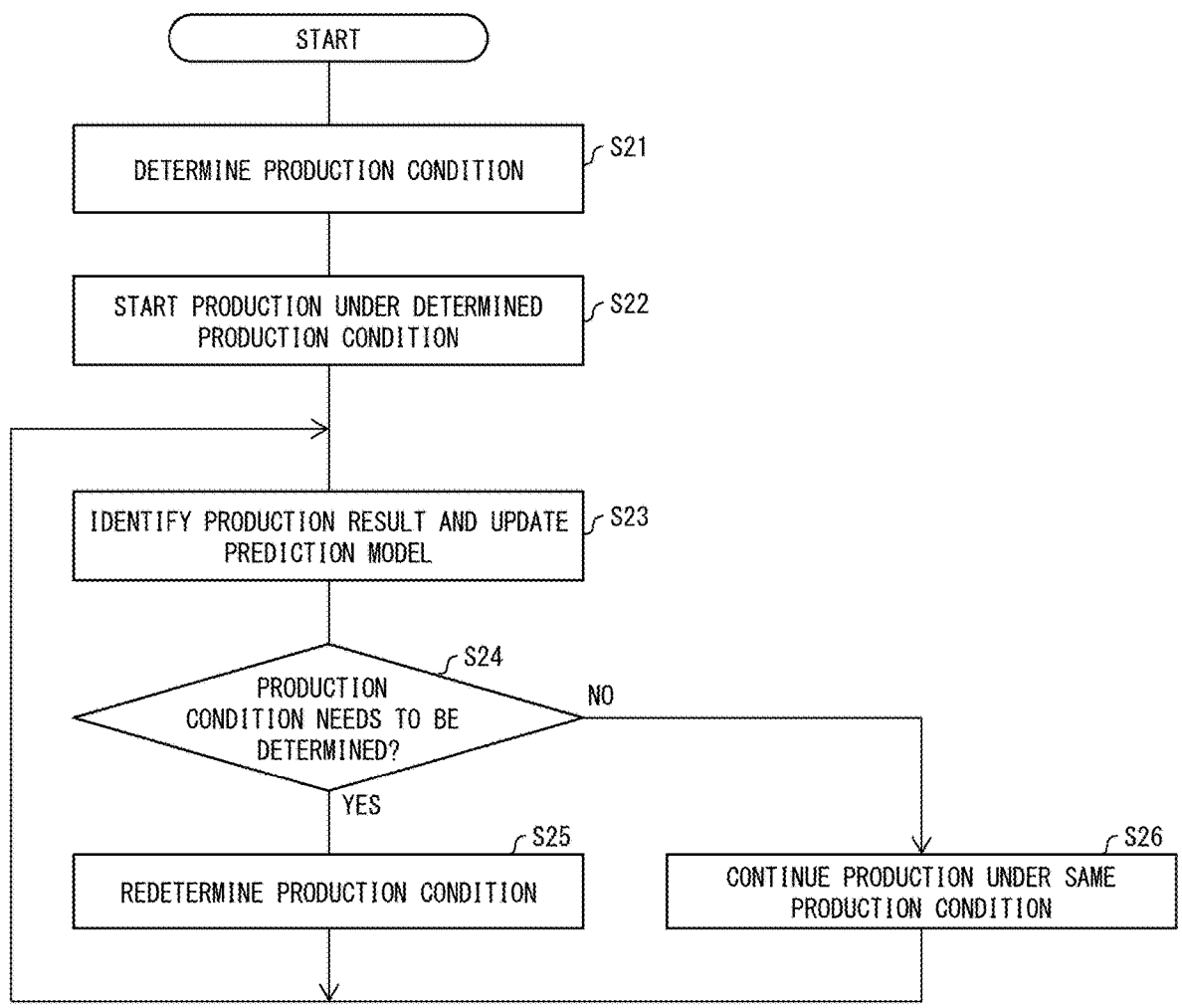

PRODUCTION SYSTEM, INFORMATION PROCESSING METHOD, AND PRODUCTION METHOD

TECHNICAL FIELD

The present invention relates to a production system and the like for producing a product such as a chemical product.

BACKGROUND ART

At production sites for various products such as a chemical plant, a process of producing a product and checking the quality, yield, and the like of the product is repeated under varying production conditions to determine an optimum production condition. This is because carrying out production under the same production circumstance is not possible due to factors such as: variations in the quality of a raw material used, a result of process in a previous production step, and the like; occurrence of disturbance; and deterioration of a facility.

The level of product quality expected by clients is becoming increasingly higher in recent years, and a range (a process window) of production conditions that satisfy such an expected level of quality is extremely narrow. Accordingly, the above conventional technique faces: an extended period of time that is required before an optimum production condition is found; production loss due to repeatedly carrying out production under an inadequate production condition; and the like. The technique thus has room for improvement in terms of productivity. Further, in order for high productivity to be achieved stably, it is necessary to apply a production condition in accordance with a change in a process state or the like and disturbance. In a conventional production system, determination of what production conditions to apply depends on the abilities (know-how, skill, and the like) of a production operator.

Among conventional techniques for improving accuracy of a control performed in a chemical plant and the like, for example, Patent Literature 1 discloses the following technique. Specifically, Patent Literature 1 discloses that a plurality of actual measurement samples, each consisting of a plant operation condition and a measured value, are clustered and a statistical model is constructed for each class obtained. Patent Literature 1 further discloses that when a new sample is provided, a presumable class to which the new sample belongs is determined, and the new sample is applied to a statistical model corresponding to the determined class to estimate a molecular weight of a product to be produced.

CITATION LIST

Patent Literature

[Patent Literature 1]
Japanese Patent Application Publication, Tokukai, No. 2011-8562 (Publication Date: Jan. 13, 2011)

SUMMARY OF INVENTION

The conventional technique as described above allows estimating a molecular weight of a product, but does not allow automatically determining a production condition under which a desired production result can be achieved. One or more embodiments of the present invention provide a production system or the like that enables automatically determining, without actually producing a product, a production condition under which a desired production result can be achieved.

A production system for producing a product according to one or more embodiments of the invention include a production facility and an information processing device comprising a computer processor that: (i) generates one or more production condition candidates each of which is a candidate for a production condition under which the product is produced; (ii) determines, using a prediction model, a prediction of a production result of a case in which the product is produced under each of the one or more production condition candidates; and (iii) generates, by evaluating a result of the prediction based on a predetermined evaluation standard, an evaluation of each of the one or more production condition candidates, wherein the prediction model is (a) constructed with data indicative of a previous production condition under which the product was previously produced in the system and a previous production result of production of the product under the previous production condition and (b) indicates a relationship between the production condition under which the product is produced and the production result of the product produced under the production condition, the computer processor repeats the process (ii) while changing between the one or more production condition candidates, and determines a production condition candidate, the evaluation of which in the process (iii) satisfies a predetermined standard, to be the production condition under which the product is to be produced, the computer processor outputs the determined production condition, and the production facility produces the product under the outputted production condition.

One or more embodiments of the invention can provide various advantages, including automatically determining, without actually producing a product, a production condition under which a desired production result can be achieved.

BRIEF DESCRIPTION OF DRAWINGS

FIG. 9 is a view illustrating an example of a UI screen for the information processing device to present, upon reception of an input of a production condition, a production result predicted.

FIG. 10 is a flowchart illustrating an example of a production method, carried out by the production system, for producing a product.

DETAILED DESCRIPTION OF EMBODIMENTS

[Overview of Production System]

Figure 2:
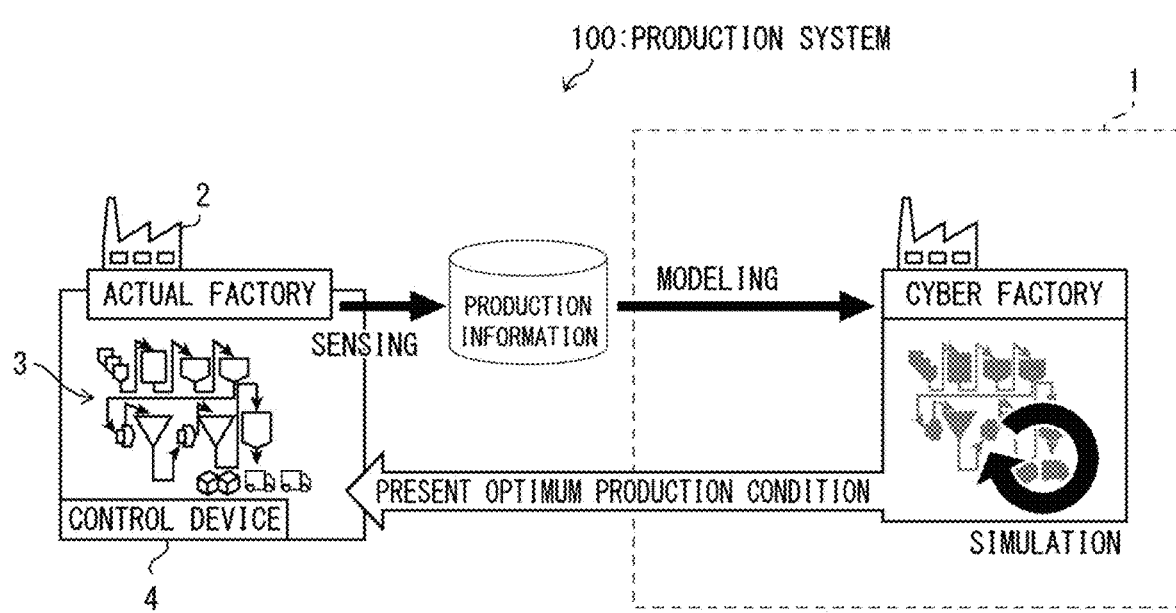
FIG. 2 is a view illustrating an overview of a production system including the information processing device.

The following description will discuss, with reference to FIG. 2, an overview of a production system in accordance with one or more embodiments of the present invention. FIG. 2 is a view illustrating an overview of a production system 100. The production system 100 is a production system for producing, as a product, a chemical product or a processed product of the chemical product. The production system 100 may include a cyber factory realized by an information processing device 1 and an actual factory 2 in which the product is actually produced. In the actual factory 2, a production facility 3 for producing the product and a control device 4 for controlling an operation of the production facility 3 are provided.

In the production system 100, a production condition under which the product is produced in the actual factory 2, data obtained by sensing during production of the product, data indicative of a production result, and the like are accumulated as production information. The information processing device 1 may be a computer (calculation device) that models the actual factory 2 using the accumulated production information so as to construct the cyber factory.

As detailed later, the cyber factory is constituted by a prediction model that is (a) constructed using data indicative of: a previous production condition under which the product was produced in the production system 100 in the past; and a production result of production of the product under the production condition and (b) indicative of a relationship between a production condition under which the product is produced and a production result of the product produced under the production condition.

The information processing device 1 carries out simulations of production of the product under various production conditions, and presents an optimum production condition. Under this production condition, production of the product is carried out in the actual factory 2. In the simulations, the information processing device 1 carries out the processes of: (i) generating a production condition candidate(s) each of which is a candidate for a production condition under which the product is produced; (ii) making, using the prediction model, a prediction of a production result of a case in which the product is produced under each of the production condition candidate(s); and (iii) making, based on a result of the prediction, an evaluation of whether or not each of the production condition candidate(s) is suitable. The information processing device 1 repeatedly carries out the process (ii) while changing between the production condition candidates, and determines a production condition candidate, the evaluation of which in the process (iii) satisfies a predetermined standard, to be a production condition under which the product is produced.

According to one or more embodiments of the above configuration, it is possible to determine, without actually producing a chemical product or the like, a production condition under which a production result satisfying a predetermined standard can be achieved. For example, in a case where a predetermined evaluation standard of the production condition candidate(s) specifies that an evaluation value increases as a product yield indicated by the result of the prediction increases, the predetermined standard may be a threshold value of the evaluation value. This increases the productivity of a chemical product or the like by quickly discovering an appropriate production condition without repeating production under inappropriate production conditions. Further, the production system 100 stably achieves high productivity by determining an appropriate production condition without depending on abilities of a production operator. In addition, one or more embodiments of the above configuration can be used for predicting, based on various production data, a state and a future behavior of a production process as well as a quality and the like of a product to be produced.

[Example of Production Process]

Figure 3:
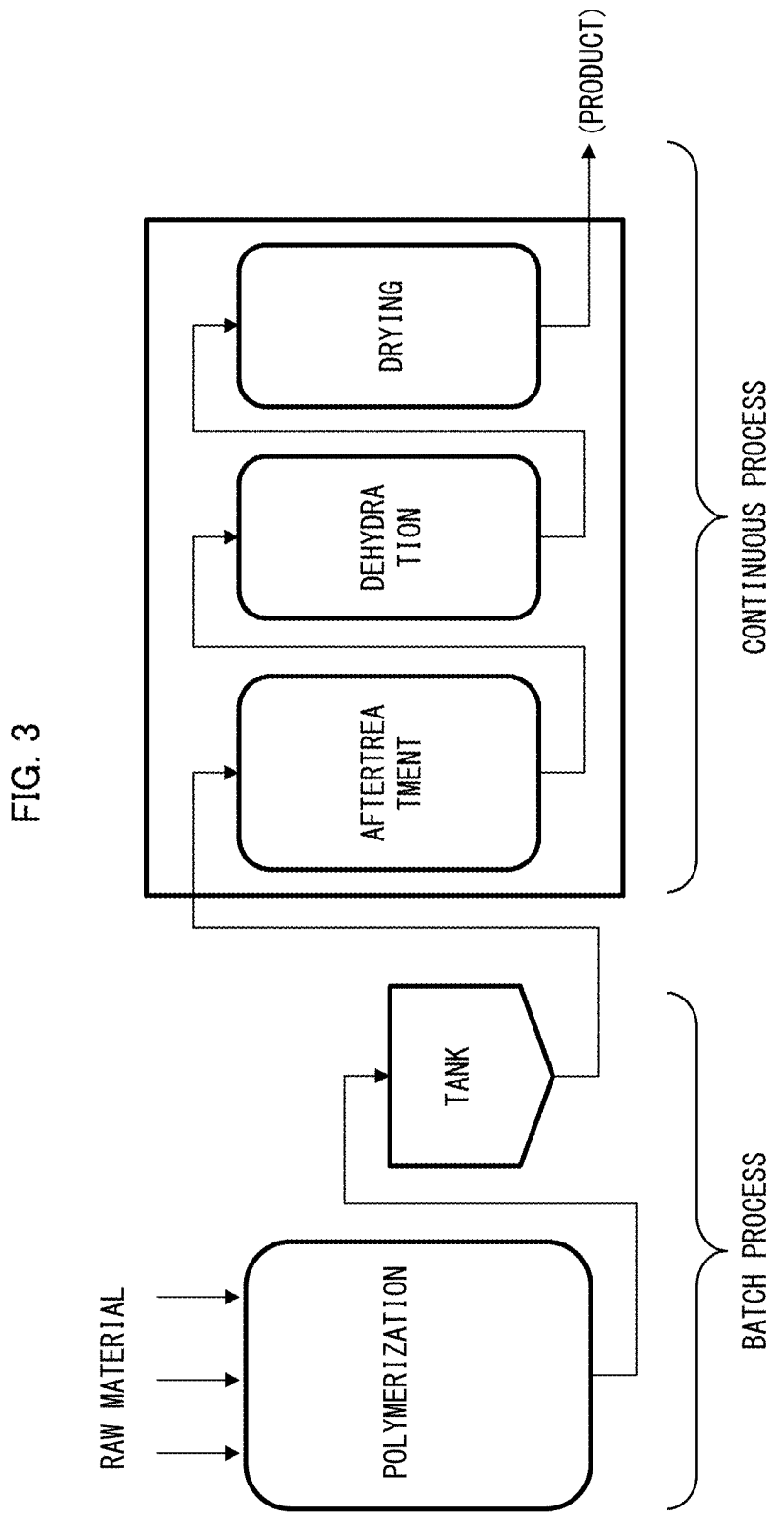
FIG. 3 is a view illustrating an example of a production process for producing powder resin.

Described below is an example in which powder resin (i.e., resin in a powdery form) is produced in the actual factory 2. The powder resin may be produced, for example, by a production process as illustrated in FIG. 3. FIG. 3 is a view illustrating an example of the production process for producing the powder resin.

The production process illustrated in FIG. 3 can be divided into a batch process and a continuous process. In the batch process, a process of carrying out polymerization of a raw material of the powder resin and a process of accumulating the resin thus obtained in a tank are repeatedly carried out. In the continuous process, processes of aftertreatment, dehydration, and drying are sequentially carried out with respect to the resin accumulated in the tank after being produced by the polymerization in the batch process. Thus produced is the powder resin, which serves as the product.

The information processing device 1 may generate the prediction model, for example, by modeling the continuous process. This allows the information processing device 1 to carry out simulations of production of the powder resin so as to determine an optimum production condition for producing the powder resin. The information processing device 1 can model any step of a production process for producing any product, and a subject of the modeling is not limited to the example illustrated in FIG. 3.

[Configuration of Information Processing Device]

Figure 1:
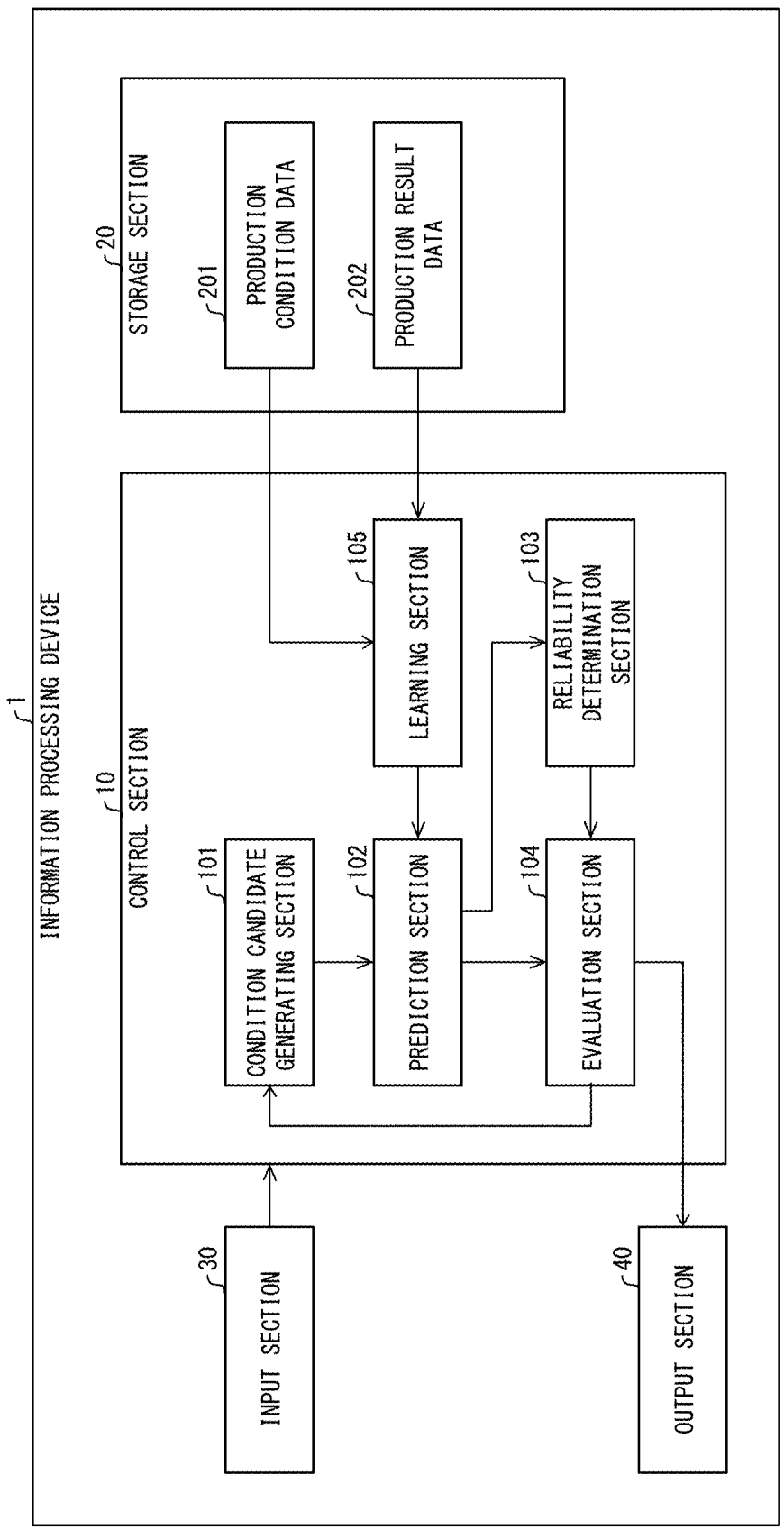
FIG. 1 is a block diagram illustrating an example of a configuration of main parts of an information processing device in accordance with one or more embodiments of the present invention.

The following description will discuss, with reference to FIG. 1, a configuration of the information processing device 1. FIG. 1 is a block diagram illustrating an example of a configuration of main parts of the information processing device 1. The information processing device 1 includes a control section (computer processor) 10 that comprehensively controls the other components of the information processing device 1, a storage section (storage) 20 that stores various kinds of data used by the information processing device 1, an input section (this section can be implemented as an input circuit) 30 that receives an input operation with respect to the information processing device 1, and an output section (this section can be implemented as an output device or an output circuit) 40 that is used when the information processing device 1 outputs data. A mode of output carried out by the output section 40 is not particularly limited, and can be, for example, output by display, output by printing, or output by voice. The control section 10 includes a condition candidate generating section (this section can be implemented as a generating circuit) 101, a prediction section (this section can be implemented as a prediction circuit) 102, a reliability determination section (this section can be implemented as a reliability determination circuit) 103, an evaluation section (this section can be implemented as an evaluation circuit) 104 and a learning section (this section can be implemented as a learning circuit) 105. The storage section 20 stores therein production condition data 201 and production result data 202.

The storage section 20, the input section 30, and the output section 40 may each be a device externally attached to the information processing device 1. Further, it is possible to impart a function of a part of the blocks included in the control section 10 to another device capable of communicating with the information processing device 1, and omit the part of the blocks from the control section 10. For example, the function of the learning section 105 may be imparted to the another device. In such a case, the information processing device 1 can carry out a prediction by obtaining a prediction model generated by the another device.

The condition candidate generating section 101 generates a candidate (hereinafter referred to as a condition candidate) for a production condition under which the product is produced. Various techniques can be applied to generation of the condition candidate. For example, in a case where the production condition includes a plurality of items, the condition candidate generating section 101 may determine a value of each of the plurality of items randomly or in accordance with a predetermined rule. As another example, the condition candidate generating section 101 may subject a previous production condition (i.e., production condition applied in the past) to a process such as adding or subtracting a predetermined value to or from the production condition and use a production condition thus processed as a condition candidate, or may generate a condition candidate by a technique such as grid search.

Further, the condition candidate generating section 101 may construct a learned model for generating a condition candidate, by carry out machine learning using, as training data (correct data), a production condition determined by the evaluation section 104 and information indicative of a circumstance under which the production condition was determined. This allows generating a condition candidate with high validity. Examples of the information indicative of the circumstance under which the production condition was determined encompass information on the production facility 3 and a raw material used in the production, an ambient temperature, and the like.

After a prediction of a production result is carried out based on a condition candidate, the condition candidate generating section 101 may generate a new condition candidate based on a result of the prediction. This allows efficiently determining an optimum production condition. For example, the condition candidate generating section 101 may apply a heuristic technique or a metaheuristic technique.

Examples of the metaheuristic technique encompass PSO (Particle Swarm Optimization). In a case of using PSO, the condition candidate generating section 101 represents, in the form of a vector, each of condition candidates that have been generated so far. The vector includes, as elements, values (e.g., production temperature, pressure, and the like) of respective items constituting the each of the condition candidates. The condition candidate generating section 101 identifies the most highly evaluated one of the condition candidates that were generated. Then, the condition candidate generating section 101 updates the other condition candidates that were generated, such that the other ones are approximated to the most highly evaluated one in a vector space so as to be used as new condition candidates.

The prediction section 102 makes, using the prediction model, a prediction of a production result of a case in which the product is produced under each of the production conditions indicated by the condition candidates. As detailed later, the prediction model is generated by the learning circuit 105.

The reliability determination section 103 determines reliability of the production result predicted by the prediction section 102. A technique of determining the reliability is not particularly limited. For example, the reliability determination section 103 may determine the reliability of the production condition indicated by the condition candidate, in accordance with a degree of divergence between the production condition candidate and each of a plurality of production conditions applied to production of the product in the past.

In a case of making a prediction of a production result using a prediction model, it is possible to make a highly accurate prediction of a production result of production under a production condition similar to a production condition that was used in construction of the prediction model. However, accuracy may decrease in a prediction of a production result of production of the product under a production condition diverging from a production condition that was used in construction of the prediction model. Further, there is a possibility that a production condition candidate generated indicates a production condition that is impossible to implement in reality.

In contrast, in a case where a configuration is adopted in which reliability is determined in accordance with a degree of divergence from a plurality of previous production conditions (i.e., production conditions applied in the past), it is possible to make it more difficult for a candidate, which corresponds to a production result obtained with a possibly reduced prediction accuracy, to be determined as a finalized production condition. This enhances reliability of a production condition determined. Further, even in a case where a candidate indicative of a production condition that is impossible to implement in reality is generated, it is possible to make it less likely that such a candidate is determined as a finalized production condition.

Previous production conditions (i.e., production conditions applied in the past) are included in the production condition data 201. The reliability determination section 103 may determine reliability, for example, by a One Class SVM (Support Vector Machine). The One Class SVM allows calculating a numerical value which indicates whether or not a production condition indicated by a condition candidate is a production condition that frequently appears in the production condition data 201 (i.e., a reliable production condition).

The evaluation section 104 makes, based on a result of a prediction made by the prediction section 102, an evaluation of whether or not each condition candidate is suitable. A method of evaluation is not particularly limited. For example, the evaluation section 104 can use, as an evaluation result, an evaluation value calculated by inputting, to a predetermined evaluation function, a numerical value of a production result outputted from the prediction section 102. For example, in a case where the above numerical value is a numerical value (e.g., a product yield) that is considered better as the numerical value increases, the evaluation function may be a function that outputs a higher evaluation value as the numerical value inputted to the function increases. An example of the evaluation method will be described later with reference to FIG. 6.

The learning section 105 constructs the above-described prediction model using data indicative of: a previous production condition under which the product was produced in the production system 100 in the past; and a production result of production of the product under the production condition. The prediction model is indicative of a relationship between a production condition under which the product is produced and a production result of the product produced under the production condition.

An explanatory variable in the prediction model is a numerical value indicative of a production condition. For example, a numerical value indicative of temperature, pressure, pH, or the like in each production step of the product serves as an explanatory variable. In order to achieve a required level of prediction accuracy, the number of explanatory variables is basically two or more. An objective variable in the prediction model is a numerical value indicative of a production result of production of the product. For example, a numerical value indicative of a yield of the product, a composition of the product, or the like serves as an objective variable. The number of objective variables should be at least one. Examples of a method of modeling a relationship between the above-described explanatory variables and the objective variable(s) encompass a method using a statistical model. The prediction model may be a linear model or a nonlinear model. As specific examples, the prediction model may be constructed using least squares method, principal-component regression, neural network, k-NN method (k-nearest neighbor algorithm), support vector regression (SVR), or the like.

In a case of constructing the prediction model using regression analysis, the learning section 105 may use, for example, PLS (Partial Least Squares) regression analysis. PLS regression analysis is a statistical analysis method and enables stable prediction even with respect to data having multicollinearity (a strong correlation between explanatory variables). Among parameters that can be used as explanatory variables in the production system 100, for example, temperature, pressure, and the like have multicollinearity. Accordingly, PLS regression analysis is suitable for construction of the prediction model used in a simulation in the production system 100. Further, a prediction model constructed by a statistical analysis technique such as PLS regression analysis is easy for a human to understand, and therefore is also usable for analysis of a variable factor in a prediction result.

The production condition data 201 is data indicative of a previous production condition under which the product was produced in the production system 100 in the past. The production result data 202 is data indicative of a previous production result of production of the product in the production system 100 in the past. A production result and a production condition under which the production result is obtained are associated with each other. As described above, the learning circuit 105 uses these data to construct the prediction model. These data may be data inputted by a user or may be data inputted from a measurement device such as a sensor.

[Examples of Explanatory Variable and Objective Variable]

An explanatory variable in a prediction model, that is, a production condition used for prediction, may be any information that is associated with an objective variable in the prediction model, that is, a prediction result. For example, the production condition may include at least one of: information on a raw material of the product; information on the production facility 3 included in the production system 100; and temperature, pressure, flow velocity, flow rate, throughput per unit time, valve-opening degree, a liquid level, an electric current value, a motor rotation rate, torque, sequence time (e.g., processing time), and/or hydrogen ion concentration during production of the product. Further, in a case where, for example, the production process includes a step of blowing air for the purpose of drying or the like of the product or a semi-finished product, volume and/or velocity of the air may be included in the production condition. The temperature and the pressure may be temperature and pressure inside a reaction container, or may be temperature and pressure outside the reaction container (i.e., temperature and pressure around the production facility 3). The above-described various information is closely associated with a production result of production of the product. Accordingly, use of the various information as a production condition (explanatory variables) allows constructing a prediction model with high prediction accuracy.

Examples of the information on the production facility 3 encompass information indicative of types, amounts, or deterioration degrees of devices and tools included in the production facility 3, and the like. Examples of the information indicative of a deterioration degree encompass information indicative of a degree of physical deterioration such as wear, information indicative of the number of times a device or a tool was used and a period during which the device or the tool was used, information indicative of a degree of fouling in piping, and the like. In a case where information on the production facility 3 is thus included in a production condition when constructing the prediction model, it is possible to determine an optimum production condition in accordance with the production facility 3 used.

Examples of the information on a raw material encompass an amount of the raw material added, a shape of the raw material, physical properties (e.g., a heat quantity identified by thermodynamic measurement or resin properties) of the raw material, an appearance (e.g., color) of the raw material, and a volatile component content in the raw material, and the like. These pieces of information can be obtained, for example, by inspecting the raw material. Further, in a case of producing the product using a plurality of raw materials in combination, an added amount of each material, a ratio of amounts of the raw materials used, and the like may be used as the information on a raw material. Apart from these, a production condition under which a raw material is produced and information on a production facility for producing the raw material (e.g., information indicative of a shape of a device or a tool included in the production facility, the number of times the device or the tool was used, and the like) may be used as the information on a raw material. In a case where the information on a raw material is thus included in a production condition when constructing the prediction model, it is possible to determine an optimum production condition taking account of changes in quality of the raw material and the like. For example, in a case where a polymer is used as the raw material, a result of inspection of a composition of the polymer may be included in a production condition. This allows stably determining an optimum production condition even in a case where the composition of the polymer serving as the raw material changes.

An objective variable in a prediction model, that is, a production result predicted by the prediction model, may be any objective variable that serves as an evaluation index in accordance with which whether or not the product is suitable is evaluated. For example, at least one of production efficiency, production volume, yield, time required for production, production cost, quality, a shape (e.g., particle size, width, length, aspect ratio, weight, bulk density, or the like), physical properties (e.g., fluidity, specific heat capacity, pressure resistance, water content, bulk specific gravity, or the like), and appearance of the product may be used as an objective variable in the prediction model.

In a case where a prediction model is constructed using the above-described information as an objective variable, the evaluation section 104 evaluates a condition candidate in accordance with at least one of: production efficiency indicated by a production result predicted; production volume of the product indicated by the production result predicted; yield of the product indicated by the production result predicted; time required for production of the product indicated by the production result predicted; production cost of the product indicated by the production result predicted; a quality of the product indicated by the production result predicted; a shape of the product indicated by the production result predicted; physical properties of the product indicated by the production result predicted; and appearance of the product indicated by the production result predicted. This allows determining a production condition under which a desired production result can be obtained. For example, in a case where a prediction model constructed using a yield as an objective variable is used, it is possible to determine a production condition under which the product can be produced with a desired yield.

[Construction of Prediction Model]

Figure 4:
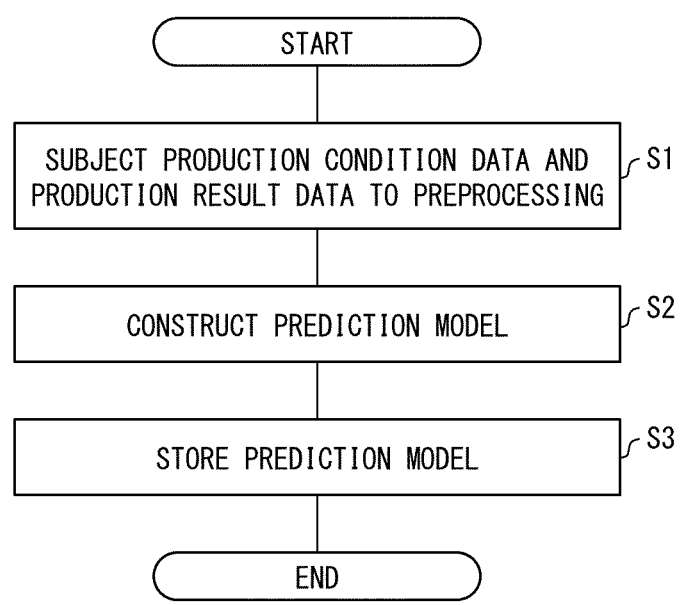
FIG. 4 is a flowchart showing an example of a method for constructing a prediction model.

The following description will discuss, with reference to FIG. 4, a method carried out by the learning section 105 for constructing a prediction model. FIG. 4 is a flowchart showing an example of a method for constructing a prediction model.

At S1, the learning section 105 reads out the production condition data 201 and the production result data 202 stored in the storage section 20, and subjects these data to a predetermined preprocessing. The data read out may be data obtained during a predetermined length of period immediately before construction of a prediction model (the moving window method). This allows constructing a prediction model in accordance with a change over time in the actual factory 2 and the like. The preprocessing may be any processing that does not cause a loss of a characteristic point of the data. For example, the learning section 105 may carry out, as the preprocessing, a processing of removing a noise included in the data.

At S2, the learning section 105 constructs a prediction model using the data which has been subject to the preprocessing at S1. Then at S3, the learning section 105 causes the prediction model constructed at S2 to be stored, and the process shown in FIG. 4 is ended, accordingly. The prediction model caused by the learning section 105 to be stored is used for prediction by the prediction section 102, and therefore may be stored in a place from which the prediction model can be read out by the prediction section 102. For example, the learning section 105 may cause the prediction model to be stored in the storage section 20.

[Prediction Accuracy]

Figure 5:
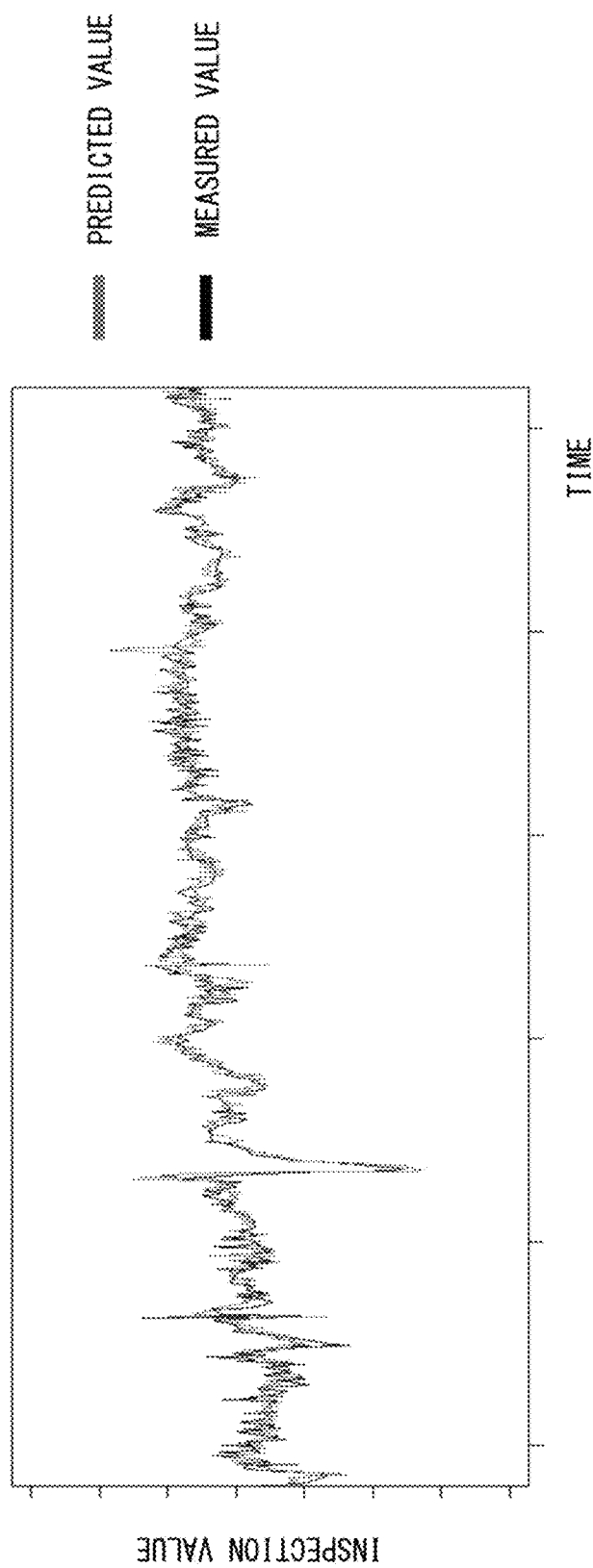
FIG. 5 is a graph indicative of a predicted value of a volatile component content in powder resin calculated by a prediction model obtained by modeling a continuous process of FIG. 3 using PLS regression analysis.

FIG. 5 is a graph indicative of a predicted value of a volatile component content in powder resin (an inspection value obtained during an inspection of the powder resin as a product) calculated by a prediction model obtained by modeling the continuous process of FIG. 3 using PLS regression analysis. FIG. 5 also shows, for comparison, a graph indicative of a measured value of the volatile component content in the powder resin. A grey line represents the graph of the predicted value and a black line represents the graph of the measured value. It is understood from FIG. 5 that the predicted value calculated by the prediction model constructed by the PLS regression analysis and the measured value are in alignment with each other extremely well.

The PLS regression analysis used, as explanatory variables, production conditions (a total of 20 items including throughput, temperature, pressure, pH, and the like in each facility, and the like) of the aftertreatment to the drying of the production process for producing the powder resin (FIG. 3). Further, a content of a volatile component in the powder resin produced is used as an objective variable. Data used for construction of the prediction model are data accumulated during 3 months of production of the powder resin in the actual factory 2.

[Evaluation of Condition Candidate]

Figure 6:
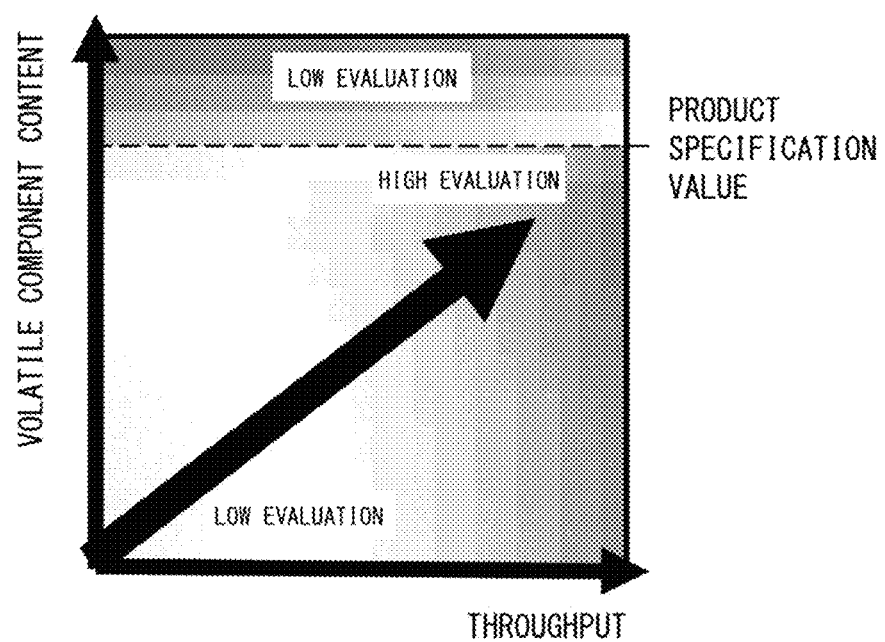
FIG. 6 is a view showing an example of a method for calculating an evaluation value of a condition candidate.

The evaluation section 104 may calculate an evaluation value of a condition candidate and evaluate the condition candidate based on the evaluation value. In such a case, the evaluation section 104 may determine the evaluation value, for example, by a method shown in FIG. 6. FIG. 6 is a view showing an example of a method for calculating an evaluation value of a condition candidate.

In the example of FIG. 6, the evaluation value of the condition candidate is determined based on two indices: throughput and a volatile component content. The throughput (throughput per unit time in the production system 100) is an example of a production condition, and a value of the throughput is inputted to a prediction model. In production of a product, the greater the throughput, the better. As such, in an evaluation based on the throughput, a condition candidate with a greater value of the throughput is evaluated more highly.

The volatile component content is an example of a production result, and a value of the volatile component content is predicted by a prediction model. For example, in a case where the product is powder resin, it may be considered that the higher the value of the volatile component content, the better, as long as the value does not exceed a value of a product specification. In such a case, in an evaluation based on the volatile component content, the evaluation section 104 evaluates the condition candidate more highly as the value of the volatile component content increases, but evaluates the condition candidate less highly when the value of the volatile component content exceeds the value of the product specification. Thus, by evaluating a condition candidate in accordance with a volatile component content in powder resin, it is possible to determine a production condition under which powder resin having a desired volatile component content can be produced.

As shown in the example of FIG. 6, the evaluation section 104 may evaluate a condition candidate based on: at least a part (in the above example, the volatile component content) of a production result predicted by a prediction model; and at least a part (in the above example, the throughput) of a production condition indicated by the condition candidate. This allows taking account of at least a part of a production condition when determining a production condition under which a desired production result can be obtained. A method for determining an evaluation value from a plurality of indices is not particularly limited. For example, the evaluation section 104 may calculate evaluation values from the respective indices and determine a single evaluation value by forming a linear combination of these evaluation values.

Further, the evaluation section 104 may evaluate a condition candidate based on: an evaluation result of a part of a production result predicted by a prediction model; and an evaluation result of another part of the production result. For example, in a case where a yield of the product and a defect rate of the product are predicted by a prediction model, the evaluation section 104 may calculate an evaluation value (which has a higher value as the yield increases) based on the yield and an evaluation value (which has a higher value as the defect rate decreases) based on the defect rate. Then, the evaluation section 104 may determine a single evaluation value based on these evaluation values. This allows taking account of a plurality of evaluation results with respect to a production result when determining a production condition. Accordingly, it becomes possible to determine a production condition that can satisfy various conditions.

Further, in evaluation of a condition candidate, a result of determination of reliability made by the reliability determination section 103 can be taken into account. In such a case, the evaluation section 104 evaluates the condition candidate in accordance with the reliability. This makes it less likely that a condition candidate (e.g., a condition candidate indicative of an unrealistic production condition or a condition candidate to which a learned model is not applicable) with a poor result of reliability determination is determined as an optimum production condition. Accordingly, it becomes possible to determine a production condition that is highly feasible.

For example, the evaluation section 104 may use, as an evaluation value of a condition candidate, a sum of a reliability value calculated by the reliability determination section 103 and an evaluation value calculated as described above. When calculating the sum, the evaluation section 104 may carry out affine transformation or weighting, and may normalize the reliability value and the evaluation value of the condition candidate and then add the reliability and the evaluation value thus normalized. Apart from the above, it is also possible to determine an evaluation, for example, based on a score chart or the like.

[Flow of Process]

Figure 7:
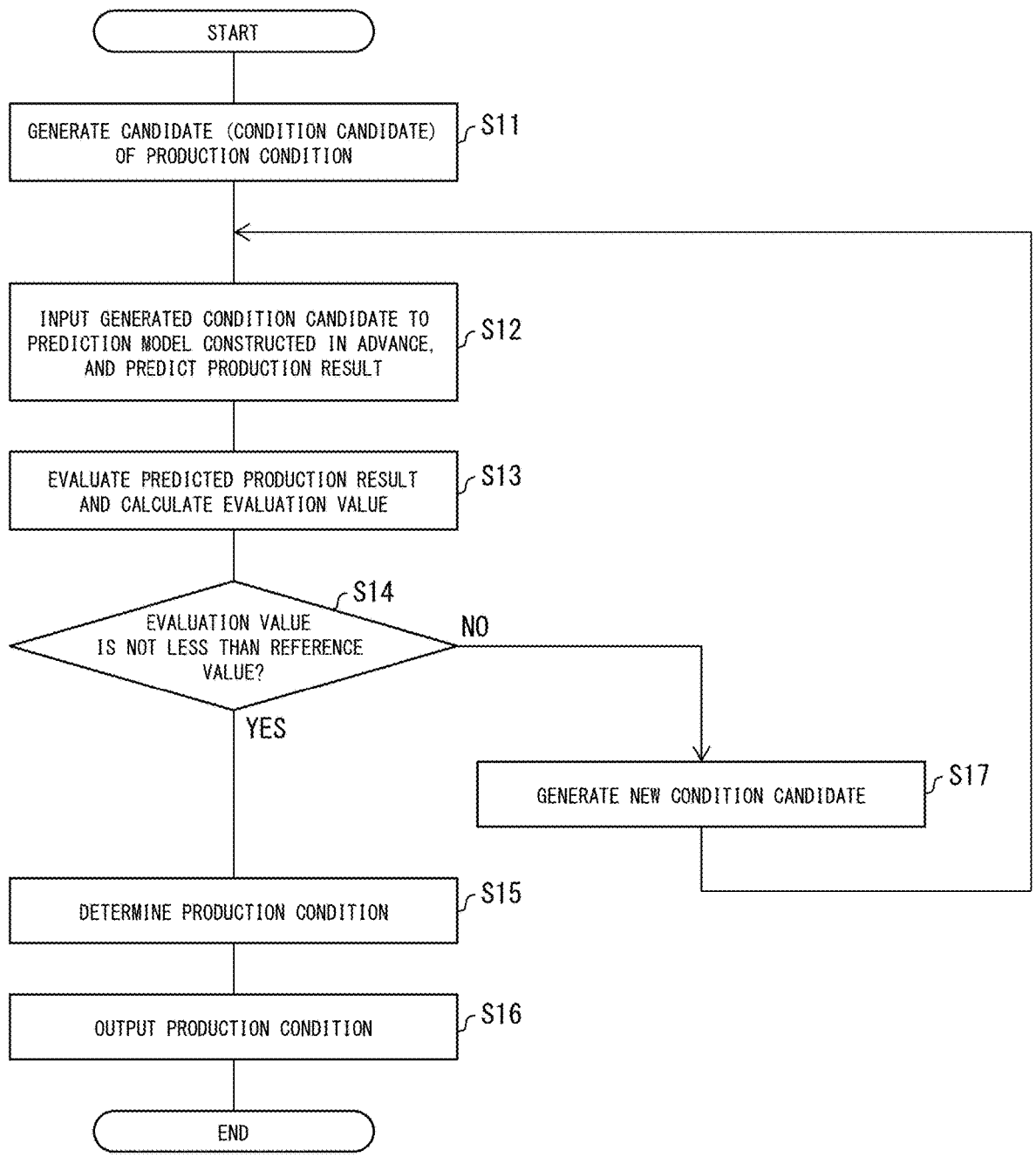
FIG. 7 is a flowchart illustrating an example of an information processing method for determining a production condition.

The following description will discuss, with reference to FIG. 7, a flow of a process by which the information processing device 1 determines a production condition. FIG. 7 is a flowchart illustrating an example of an information processing method carried out by the information processing device 1.

At S11, the condition candidate generating section 101 generates condition candidates. The number of condition candidates generated may be one, or may be two or more. Subsequently, the prediction section 102 inputs a condition candidate generated at S11 to a prediction model, constructed by the learning section 105 in advance, so as to predict a production result of a case in which the production is produced under a condition indicated by the condition candidate. The prediction section 102 may add, to a predicted value outputted from the prediction model, a mean deviation of several predicted values that were most recently calculated. This allows absorbing a short-term deviation of prediction.

At S13, the evaluation section 104 calculates an evaluation value by evaluating the production result predicted at S12. In a case where an evaluation value is calculated by taking account of a reliability value, the reliability determination section 103 calculates the reliability, and the evaluation section 104 calculates the evaluation value based on the reliability calculated and a production result predicted at S12.

At S14, the evaluation section 104 determines whether or not the evaluation value calculated at S13 is not less than a predetermined reference value. In a case where the evaluation value is determined to be not less than the reference value (YES at S14), the process proceeds to S15. In a case where the evaluation value is determined to be less than the reference value (NO at S14), the process proceeds to S17. Even in a case where the evaluation value is determined to be less than the reference value, the evaluation section 104 can determine YES at S14 if a predetermined upper limit of the number of determinations that can be made has been reached.

At S17, the condition candidate generating section 101 generates new condition candidates. After S17, the process proceeds to S12. The number of new condition candidates may be one, or may be two or more. At S17, the condition candidate generating section 101 may generate the new condition candidates based on the evaluation value calculated at S13.

At S15, the evaluation section 104 determines, as a production condition under which the product is produced, a production condition of a condition candidate with respect to which an evaluation value calculated at S13 has been determined to be not less than the reference value. In a case where there are a plurality of condition candidates with respect to which an evaluation value has been determined to be not less than the reference value, the evaluation section 104 may select one condition candidate (e.g., a condition candidate with the highest evaluation value) from among the plurality of condition candidates and determine the selected condition candidate as a production condition under which the product is produced. Then at S16, the evaluation section 104 causes the production condition determined to be outputted by the output section 40. Thus, the process of FIG. 7 is ended.

As described above, the information processing method includes a step (S11) of (i) generating a condition candidate(s), a step (S12) of (ii) making, using the prediction model, a prediction of a production result of a case in which the product is produced under each of the production condition candidate(s), and a step (S14) of (iii) making, based on a result of the prediction, an evaluation of whether or not each of the production condition candidate(s) is suitable. The information processing method further includes a step (S15) of repeatedly carrying out the process (ii) while changing between the production condition candidates, and determining a production condition candidate, the evaluation of which in the process (iii) satisfies a predetermined standard, to be a production condition under which the product is produced. Thus, the information processing method allows determining an appropriate production condition without producing a product. The process at S14 may be omitted. In such a case, the information processing method repeats the processes at S12, S13, and S17 a predetermined number of times. Then at S15, the information processing method determines, as a production condition under which the product is produced, a production condition of a condition candidate with the highest evaluation value.

[Example of Display Screen (Optimum Condition Prediction)]

Figure 8:
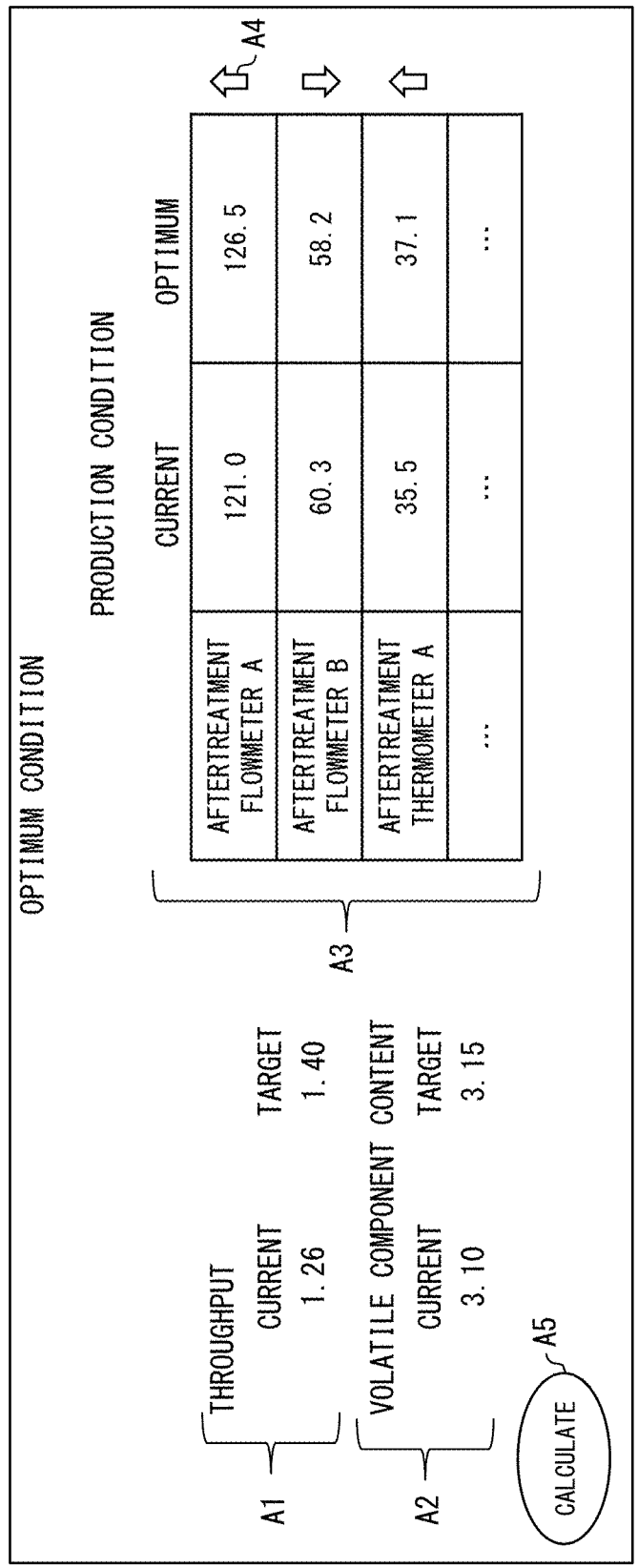
FIG. 8 is a view illustrating an example of a UI screen for causing the information processing device to determine an optimum production condition.

The following description will discuss, with reference to FIG. 8, a user interface (UI) for causing the information processing device 1 to determine an optimum production condition. FIG. 8 is a view illustrating an example of a UI screen for causing the information processing device 1 to determine an optimum production condition. In a case where the output section 40 is a display device, the UI screen may be outputted for display on the output section.

The UI screen illustrated in FIG. 8 includes a display area A1 and a display area A2. In the display area A1, throughput, which is one of the indices used by the evaluation section 104 for making an evaluation, is displayed. In the display area A2, a volatile component content, which is the other of the indices, is displayed. Further, the UI screen includes a display area A3 in which production conditions are displayed, an arrow A4 indicating a direction in which a production condition should be changed so as to be approximated to an optimum production condition, and an object A5 for causing a prediction of an optimum production condition to be started.

In the display area A1, a current value and a target value of throughput are displayed. The current value is a value of throughput under a current production condition. The target value is a value set by a user of the information processing device 1. In the display area A2, a current value and a target value of volatile component content are displayed. The current value is a volatile component content in a product produced under a current production condition, and a target value is a value set by the user of the information processing device 1. The UI screen of FIG. 8 may be configured so as to allow the user to set a target value by selecting the display area A1 or the display area A2 and inputting a desired numerical value in the selected one of the display areas A1 and A2.

After setting a target value, the user can select the object A5 so as to cause the information processing device 1 to determine an optimum production condition. Then, the optimum production condition determined is displayed at an item "OPTIMUM" of the display area A3. The optimum production condition is a production condition determined by the information processing device 1 so that the value of the throughput is not less than the target value shown in the display area A1 and the volatile component content is not less than the target value shown in the display area A2.

In the display area A3, a current production condition is displayed as well as an optimum production condition. This allows the user to know how each production condition can be adjusted so as to become a production condition under which a result that meets or exceeds the target is obtained. Further, by looking at the arrow A4, the user can recognize, at a glance, in which direction the production condition should be changed.

For example, the display area A3 in FIG. 8 shows "121.0" and "126.5" as a current value and an optimum value, respectively, of a flowmeter A in the aftertreatment step. The arrow A4 corresponding to the item "FLOWMETER A" faces upward. By looking at the arrow A4, the user can recognize, at a glance, that the production condition should be adjusted so as to increase the value of the flowmeter A, i.e., that flow rate of a fluid at a position where the flowmeter A is installed should be increased.

[Example of Display Screen (Prediction of Production Result)]

The user can input a production condition to the information processing device 1 to cause the information processing device 1 to predict a production result of production of the product under the production condition. FIG. 9 is a view illustrating an example of a UI screen for presenting, upon reception of an input of a production condition, a production result predicted. The UI screen of FIG. 9 includes a display area B1 in which a production condition that needs to be converted is displayed, a display area B2 in which a production condition is displayed, an object B3 for causing a prediction to be started, a display area B4 in which a predicted value of a production result is displayed, and a display area B5 in which reliability of the production result is displayed.

Into the display area B1, a value of a production condition that needs to be converted is inputted by a user. The value inputted by the user is displayed in the display area B1. In the example illustrated in FIG. 9, a value of throughput, which is a production condition, is inputted. The value inputted in the display area B1 is converted by the prediction section 102 into a value that can be inputted in a prediction model (for example, a unit of the inputted value is converted to another unit), and is displayed in the display area B2. In the example illustrated in FIG. 9, a numerical value "123.2" indicated with a hatching is a numerical value which has been converted.

In the display area B2, a current production condition and a new condition, i.e., a production condition inputted by the user, are displayed. It is not necessary for the user to input all of the items of a production condition. The user may input only a part of the items of the production condition. In such a case, a value of an item that is not inputted by the user may be determined by the condition candidate generating section 101, or a value previously inputted by the user or a value of the current production condition may be used as the value of the item that is not inputted by the user.

In a case where the object B3 is selected in a state where all of the items of the new production condition have been inputted, the prediction section 102 inputs the inputted value of each item to the prediction model and makes a prediction of a production result, and causes a prediction result to be displayed on the UI screen. Based on the value of each item thus inputted, the reliability determination section 103 calculates a reliability of the prediction result and causes a result of calculation to be displayed on the UI screen. In the example illustrated in FIG. 9, a volatile component content is displayed as a prediction result in the display area B4 and a reliability is displayed in the display area B5.

The above-described function allows finding out what production condition gives what influence on a production result. This enables an improvement in productivity. For example, as a result of having an operator at an actual production site use the function, it was revealed that a production condition that had not been a target of control had a significant influence on quality. By adjusting this production condition, a significant improvement in productivity was achieved.

[Production Method for Producing Product]

FIG. 10 is a flowchart illustrating an example of a production method, carried out by the production system 100, for producing a product. The product to be produced is not particularly limited, and may be, for example, a chemical product or a processed product of the chemical product.

At S21, the information processing device 1 performs the process shown in FIG. 7 so as to determine a production condition, an evaluation of which satisfies a predetermined standard. Then, the evaluation section 104 of the information processing device 1 notifies the control device 4 (see FIG. 2) of the determined production condition. This notification may be performed by a wired communication or a wireless communication.

At S22, the control device 4 controls the production facility 3 to start production of the product under the notified production condition. The control device 4 does not have to perform all of the controls related to production of the product. For example, application of a part of the notified production condition may be performed by an operator or the like at the actual factory 2.

At S23, the learning section 105 identifies a production result of a product produced under the production condition determined at S21, and updates the prediction model using the production condition and the production result. In a case where a configuration is employed in which information indicative of a production result is inputted automatically or manually to the information processing device 1, the learning section 105 can identify the production result. When updating the prediction model, the learning section 105, for example, may add the production condition and the production result to production conditions and production results that were read out respectively from the production condition data 201 and the production result data 202. Then, a prediction model may be reconstructed using the production conditions and the production results.

At S24, the condition candidate generating section 101 of the information processing device 1 determines whether or not it is necessary to redetermine a production condition. In a case where the redetermination of the production condition is determined to be necessary (YES at S24), the process proceeds to S25, and in a case where the redetermination of the production condition is determined to be unnecessary (NO at S24), the process proceeds to S26.

For example, in a case where a production condition inputted to the prediction model includes information on a raw material of the product, the condition candidate generating section 101 may determine, when the raw material of the product has changed, that it is necessary to redetermine the production condition. In such a case, the condition candidate generating section 101 may determine the redetermination of the production condition is necessary when, for example, a raw material supplied to the production facility 3 has changed from a raw material that has been produced in a certain batch process to a raw material that has been produced in the next batch process. Further, in a case where the production condition inputted to the prediction model includes temperature around the production facility 3, the condition candidate generating section 101 may determine, when the temperature around the production facility 3 has changed by a predetermined value or more, that the redetermination of the production condition is necessary. Apart from the above, for example, the condition candidate generating section 101 may determine that the redetermination of the production condition is necessary, (i) in a case where a predetermined period has passed since the production condition was last determined, (ii) in a case in which production of the product has been performed a predetermined number of times since the production condition was last determined, or (iii) after the prediction model is updated.

At S25, the production condition is redetermined by the information processing device 1. Specifically, by processes similar to those of S11 through S15 in FIG. 7, a suitable production condition is newly determined, and the control device 4 starts production under the production condition newly determined. Then, the process returns to S23. In redetermination of a production condition, the condition candidate generating circuit 101 generates a condition candidate using, as a fixed value, a production condition related to a cause of the redetermination. For example, in a case where the redetermination is performed due to a change in temperature around the production facility 3 by a predetermined value or more, the condition candidate generating circuit 101 generates a condition candidate such that a "temperature around the production facility 3" in the condition candidate is fixed to a current temperature.

At S26, no redetermination of the production condition is carried out, and the control device 4 continues the production under the same production condition, accordingly. Then, the process returns to S23. Timing for carrying out the identification of a production result and the update of a prediction model are not limited to the above-described examples. For example, the learning circuit 105 may identify a production result after production of the product is carried out, and store the production result as the production condition data 201 and the production result data 202 together with the production method. Then, the learning circuit 105 may update the prediction model at a timing, for example, when the number of pieces of data added to the production condition data 201 and the production result data 202 has reached a predetermined number.

As described above, in the production method according to one or more embodiments, the product is produced under a production condition determined by the process of S21, i.e., by the information processing method described with reference to FIG. 7 etc. This allows efficiently producing a desired high quality product. The scope of the present invention encompasses a product produced by the production method.

Further, in the example illustrated in FIG. 10, the production condition is redetermined when it becomes necessary to redetermine the production condition. This allows production under a suitable production condition to be continuously performed. Further, the learning circuit 105 updates a prediction model based on a production condition determined by the evaluation circuit 104 and a production result of producing the product under the production condition. This allows maintaining or improving prediction accuracy.

[Another Example of Product]

A product with respect to which the information processing device 1 determines a suitable production condition may be, for example, expanded resin obtained by expanding resin particles. A method for expanding the resin particles is not particularly limited, and may be a method in which resin particles are impregnated with a foaming agent under pressure and then the pressure is released. Alternatively, for example, a foaming agent may be injected when resin is extrusion-molded into particles, or polymerization may be conducted in the presence of a foaming agent, in order to produce resin particles containing the foaming agent.

When determining a suitable production condition in production of resin particles, the evaluation circuit 104 may evaluate a condition candidate in accordance with at least one of a specific heat capacity and a bulk density of the resin particles indicated by a production result predicted by the prediction circuit 102. This allows determining a production condition that enables production of expanded resin having a desired specific heat capacity and/or a desired bulk density.

In such a case, the learning circuit 105 may construct a prediction model, for example, using (i), as an explanatory variable, temperature, pressure, and time of each sequence in the above-described method for producing expanded resin and (ii), as an objective variable, at least one of a specific heat capacity and a bulk density of the expanded resin. The explanatory variable may include the above-described various information (information on a raw material, information on the production facility 3, and the like).

[Still Another Example of Product]

A product with respect to which the information processing device 1 determines a suitable production condition may be, for example, a balloon obtained by blow molding of a tubular member made of a thermoplastic resin. The balloon may be produced, for example, by blowing air into a tubular member called a parison tube while heating the tubular member so as to expand the tubular member. In this production method, the step of expanding the parison tube may include a process of stretching the parison tube by pulling both ends of the parison tube.

When determining a suitable production condition in production of the balloon, the evaluation circuit 104 may evaluate a condition candidate in accordance with at least one of an inner diameter, an outer diameter, film thickness, pressure-withstanding strength, and appearance of the balloon are indicated by a production result predicted. This allows determining a production condition under which a resin balloon having a desired inner diameter, outer diameter, film thickness, pressure-withstanding strength, and/or appearance can be produced.

In such a case, the learning circuit 105 may construct a prediction model, for example, using (i), as an explanatory variable, temperature of each sequence, pressure of each sequence, time of each sequence, and pulling speed during blow molding in the above-described method for producing a balloon and (ii), as an objective variable, at least one of an inner diameter, an outer diameter, film thickness, pressure-withstanding strength, and appearance of the balloon. Of course, the explanatory variable may include the above-described various information (information on a raw material, information on the production facility 3, and the like). Further, the explanatory variable may include information indicative of a result of inspection of a parison tube (an SS curve of tensile properties obtained from a tensile test, film thickness, diameter, and resin composition of the tube, and the like).

According to one or more embodiments of the information processing device 1, it is possible to determine a suitable production condition also in a production method for producing a resin or a processed material of the resin by extrusion molding, injection molding, or the like and in a production method of a resin not involving molding, as well as the above-described blow molding and molding by beads foaming. Further, the information processing device 1 allows determining a suitable production condition also in a method for producing a chemical product other than resin or a processed product of the chemical product.

[Software Implementation Example]

According to one or more embodiments, control blocks of the information processing device 1 (particularly, sections included in the control section 10) may be realized by a logic circuit (hardware) provided in an integrated circuit (IC chip) or the like, and their respective functions may be realized by software.

In the latter case, the information processing device 1 includes a computer that executes instructions of a program that is software realizing the foregoing functions. The computer, for example, includes at least one processor and a computer-readable storage medium storing the program. One or more advantages of the present invention can be achieved by the processor of the computer reading and executing the program stored in the storage medium. The processor may be, for example, a CPU (Central Processing Unit). The storage medium may be "a non-transitory tangible medium" such as a ROM (Read Only Memory), a tape, a disk, a card, a semiconductor memory, and a programmable logic circuit. The computer may further include a RAM (Random Access Memory) or the like that develops the program in executable form. Further, the program may be supplied to or made available to the computer via any transmission medium (such as a communication network and a broadcast wave) which enables transmission of the program. One aspect of the present invention can also be implemented by the program in the form of a computer data signal embedded in a carrier wave which is embodied by electronic transmission.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1: information processing device
3: production facility
100: production system

What is claimed is:

1. A system for producing a product, the system comprising:
a production facility; and
an information processing device comprising a computer processor that:
(i) generates one or more production condition candidates each of which is a candidate for a production condition under which the product is produced;
(ii) determines, using a prediction model, a prediction of a production result of a case in which the product is produced under each of the one or more production condition candidates; and
(iii) generates, by evaluating a result of the prediction based on a predetermined evaluation standard, an evaluation of each of the one or more production condition candidates, wherein
the prediction model is (a) constructed with data indicative of a previous production condition under which the product was previously produced in the system and a previous production result of production of the product under the previous production condition and (b) indicates a relationship between the production condition under which the product is produced and the production result of the product produced under the production condition,
the computer processor repeats the process (ii) while changing between the one or more production condition candidates, and determines a production condition candidate, the evaluation of which in the process (iii) satisfies a predetermined standard, to be the production condition under which the product is to be produced,
the computer processor outputs the determined production condition, and
the production facility produces the product under the outputted production condition.

2. The system as set forth in claim 1, wherein the computer processor performs the evaluation of each of the one or more production condition candidates based on: at least a part of the production result predicted using the prediction model; and at least a part of a production condition indicated by each of the one or more production condition candidates.

3. The system as set forth in claim 1, wherein the computer processor performs the evaluation of each of the one or more production condition candidates based on at least: a result of an evaluation of a part of the production result predicted using the prediction model; and a result of an evaluation of another part of the production result.

4. The system as set forth in claim 1, wherein the computer processor:
determines reliability of the predicted production result; and
performs the evaluation of each of the one or more production condition candidates in accordance with the reliability.

5. The system as set forth in claim 4, wherein the computer processor determines the reliability in accordance with a degree of divergence between each of the one or more production condition candidates and each of a plurality of previous production conditions previously applied in production of the product.

6. The system as set forth in claim 1, wherein the computer processor updates the prediction model based on the determined production condition and a production result of production of the product under the determined production condition.

7. The system as set forth in claim 1, wherein the computer processor performs the evaluation of each of the one or more production condition candidates in accordance with at least one of: production efficiency indicated by the predicted production result; production volume of the product indicated by the predicted production result; yield of the product indicated by the predicted production result; time required for production of the product indicated by the predicted production result; production cost of the product indicated by the predicted production result; quality of the product indicated by the predicted production result; a shape of the product indicated by the predicted production result; a physical property of the product indicated by the predicted production result; and appearance of the product indicated by the predicted production result.

8. The system as set forth in claim 1, wherein the production condition includes at least one of: information on a raw material of the product; information on a production facility included in the production system; and temperature, pressure, flow velocity, flow rate, throughput per unit time, valve-opening degree, liquid level, an electric current value, a motor rotation rate, torque, sequence time, or hydrogen ion concentration during production of the product.

9. The system as set forth in claim 1, wherein:
the product is powder resin; and
the computer processor performs the evaluation of each of the one or more production condition candidates in accordance with a volatile component content of the powder resin indicated by the predicted production result.

10. The system as set forth in claim 1, wherein:
the product is expanded resin obtained by expanding resin particles; and
the computer processor performs the evaluation of each of the one or more production condition candidates in accordance with at least one of a specific heat capacity and a bulk density of the expanded resin indicated by the predicted production result.

11. The system as set forth in claim 1, wherein:
the product is a balloon obtained by blow molding of a tubular member made of a thermoplastic resin; and
the computer processor performs the evaluation of each of the one or more production condition candidates in accordance with at least one of an inner diameter, an outer diameter, film thickness, pressure-withstanding strength, and appearance of the balloon, all of which are indicated by the predicted production result.

12. An information processing method performed by a computer processor of an information processing device in a system for producing a product,
the information processing method comprising:
(i) generating one or more production condition candidates each of which is a candidate for a production condition under which the product is produced in the system;
(ii) determining, using a prediction model, a prediction of a production result of a case in which the product is produced under each of the one or more production condition candidates; and
(iii) generating, by evaluating a result of the prediction based on a predetermined evaluation standard, an evaluation of each of the one or more prediction condition candidates, wherein
the prediction model is (a) constructed with data indicative of a previous production condition under which the product was previously produced in the system and a production result of production of the product under the previous production condition and (b) indicates a relationship between the production condition under which the product is produced and the production result of the product produced under the production condition,
the information processing method further comprising:
repeating the process (ii) while changing between the one or more production condition candidates, and determines a production condition candidate, the evaluation of which in the process (iii) satisfies a predetermined standard, to be the production condition under which the product is to be produced; and
causing a production facility to produce the product under the determined production condition.

13. A method for producing a product using the information processing method according to claim 12.

* * * * *